Patented Aug. 19, 1941

2,253,064

UNITED STATES PATENT OFFICE 2,253,064

CELLULOSIC COMPOSITIONS OF MATTER CONTAINING ORGANIC ESTER AMIDES

Joseph B. Dickey and James G. McNally, Rochester, N. Y.

No Drawing. Application April 26, 1938, Serial No. 204,373

9 Claims. (Cl. 106—183)

This invention relates to compositions of matter in which cellulose derivatives, such as cellulose acetate, cellulose nitrate or cellulose ethers, are combined or mixed with other substances, such as a compatible plasticizer, and a common solvent for both, with or without other useful addition agents, so that the resulting products will have properties such as will make the composition highly advantageous for use in the plastic and analogous arts, such for instance, as the manufacture of wrapping sheets, photographic film, artificial silk, varnishes or lacquers, and the like.

One object of this invention is to produce a composition of matter which may be made into permanently transparent, strong and flexible sheets or films of desired thinness which are substantially waterproof, are unaffected by ordinary photographic fluids and possess the desired properties of a support for sensitive photographic coatings. Another object of our invention is to produce a composition which is capable of easy and convenient manipulation in the plastic and analogous arts, such as in the manufacture of sheets, films, artificial silk filaments, varnishes, lacquers and the like, and to produce a composition which will not injure, or be injured by, the substances or surfaces with which it is associated during manufacture. Other objects will become apparent to those skilled in the art to which this invention pertains.

While cellulose acetates, nitrates and ethers have been known for decades it has also been known that to utilize them in the various plastic arts it is necessary to mix therewith such plasticizing or conditioning agents as camphor, castor oil, triphenyl phosphate, monochlornaphthalene or the like. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness, and other properties which will enhance the value of the resulting product. Addition products for the same or similar purposes are also added to cellulose acetates, nitrates and ethers to prepare them for use in the other plastic arts, such as in the manufacture of lacquers, varnishes, artificial silk filaments, moulded compounds and the like. While the plasticizers or other addition agents heretofore discovered have had their utility in the art, the increasing use to which cellulose derivatives have been put and the increasing number of desirable properties required of the cellulose derivative for most purposes has made the discovery of new and economical plasticizers or other addition agents a matter of considerable importance to the art.

We have discovered that valuable properties may be induced in and/or contributed to compositions containing cellulose derivatives such as cellulose acetate, by adding thereto as plasticizing compounds organic ester amides having the general formula:

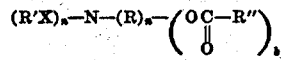

wherein R is alkyl, cycloalkyl or aryl; R' and R" are the same or different substituted or unsubstituted alkyl, aryl or cycloalkyl groups; X is —CO—; $n$ is 1, $b$ is 1 or more and R'X may stand for hydrogen. This class of compounds is compatible with cellulose derivatives and particularly compatible with cellulose acetate in the percentages hereinafter given.

Typical examples of compounds which, in accordance with our invention we have found to be valuable plasticizers are given in the following table. These compounds which may, as indicated above, be considered ester amides, or more specifically as N, N-di(acyloxyalkyl) amides, are derived by reaction on alkyol amines of appropriate acids or anhydrides.

ESTER AMIDES DERIVABLE FROM MONOETHANOLAMINE

| Compound | Formula | Boiling range |
|---|---|---|
| Diacetate | $CH_3CO-NH-C_2H_4OCOCH_3$ | 138–140° C./2 mm. |
| Acetate propionate | $CH_3CO-NH-C_2H_4OCOC_2H_5$ | 162–170° C./18 mm. |
| Acetate propionate (isomer) | $C_2H_5CO-NH-C_2H_4OCOCH_3$ | 170–175° C./19 mm. |
| Dipropionate | $C_2H_5CO-NH-C_2H_4OCOC_2H_5$ | 150–153° C./5 mm. |
| Acetate butyrate | $CH_3CO-NH-C_2H_4OCOC_3H_7$ | 170–175° C./19 mm. |
| Propionate butyrate | $C_2H_5CO-NH-C_2H_4OCOC_3H_7$ | 180–184° C./20 mm. |
| Dibutyrate | $C_3H_7CO-NH-C_2H_4OCOC_3H_7$ | 188–192° C./22 mm. |
| Butyrate caproate | $C_3H_7CO-NH-C_2H_4OCOC_5H_{11}$ | 200–210° C./20 mm. |
| Dimethoxy acetate | $CH_3OCH_2CO-NH-C_2H_4OCOCH_2OCH_3$ | 205–210° C./24 mm. |

ESTER AMIDES DERIVABLE FROM DIETHANOLAMINE

| Compound | Formula | Boiling range |
|---|---|---|
| Triacetate | $CH_3CO-N-(C_2H_4OCOCH_3)_2$ | 212–214° C./23 mm. |
| Diacetate propionate | $C_2H_5CO-N-(C_2H_4OCOCH_3)_2$ | 220–225° C./23 mm. |
| Acetate dipropionate | $CH_3CO-N-(C_2H_4OCOC_2H_5)_2$ | 215–220° C./26 mm. |
| Diacetate butyrate | $C_3H_7CO-N-(C_2H_4OCOCH_3)_2$ | 220–225° C./21 mm. |
| Tributyrate | $C_3H_7CO-N-(C_2H_4OCOC_3H_7)_2$ | 205–210° C./20 mm. |
| Acetate dibutyrate | $CH_3CO-N-(C_2H_4OCOC_3H_7)_2$ | 220–230° C./23 mm. |
| Tributyrate | $C_3H_7CO-N-(C_2H_4OCOC_3H_7)_2$ | 220–222° C./2 mm. |
| Acetate propionate butyrate | 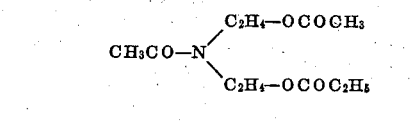 | 240–260° C./24 mm. |
| Acetate butyrate caproate | $CH_3CO-N\begin{smallmatrix}C_2H_4OCOC_3H_7\\C_2H_4OCOC_5H_{11}\end{smallmatrix}$ | 232–240° C./20 mm. |
| Dibutyrate propionate | $C_2H_5CO-N-(C_2H_4OCOC_3H_7)_2$ | 222–230° C./23 mm. |
| Dipropionate butyrate | $C_3H_7CO-N-(C_2H_4OCOC_2H_5)_2$ | 218–225° C./22 mm. |
| Tricaproate | $C_5H_{11}CO-N-(C_2H_4OCOC_5H_{11})_2$ | 235–245° C./2 mm. |

Examples of the preparation of typical compounds of this type are as follows:

PREPARATION OF DIETHANOLAMINE DIACETATE PROPIONATE

A mixture of 125 parts acetic anhydride and 80 parts propionic anhydride are added through a condenser to 60 parts diethanolamine. The reaction is extremely vigorous and a rate of addition is maintained so that the temperature remains at 100–110°. When all the anhydrides have been added, the solution is refluxed gently for 30–60 minutes. The acids are then removed either at atmospheric pressure or under vacuum and the desired product distilled under diminished pressure. One hundred and fifty parts of $$CH_3CO-N\begin{matrix}C_2H_4-OCOCH_3\\C_2H_4-OCOC_2H_5\end{matrix}$$

are obtained, boiling at 215–220°/23 mm.

PREPARATION OF ETHANOLAMINE TRIACETATE

Seven equivalents of acetyl chloride are added slowly to two equivalents of ethanolamine. The solution is then refluxed on the water bath until no more hydrogen chloride is given off. The product is then worked up in the usual way. A good yield of the triacetyl derivative is obtained, B. P. 165–170°/18 mm.

PREPARATION OF DIETHANOLAMINE TRICAPROATE

One hundred and five parts of diethanolamine, 350 parts caproic acid, 5 parts concentrated sulfuric acid and 100 parts toluene are distilled in such a manner that the toluene is continuously separated from the water of reaction and returned to the reaction vessel. The distillation is stopped when 54 parts of water have been collected. The catalyst is then neutralized by washing with sodium carbonate solution and the product recovered by distillation. Three hundred and seventy-five parts of the tri-caproyl derivative are obtained, B. P. 235–245°/5 mm.

PREPARATION OF ETHANOLAMINE PROPIONATE BUTYRATE

Sixty-one grams of ethanolamine, 130 grams of propionic anhydride and 160 grams of butyric anhydride are heated under reflux until the reaction is completed. The propionic and butyric acids formed in the reaction are distilled off and the ester-amide is distilled under reduced pressure. The compound is a colorless liquid and boils at 158–161°/11 mm.

In accordance with the invention these compounds may be applied directly to the yarn during or after spinning, or may be added to the spinning solution itself. We have found that these compounds have exceptional solvent powers which enable them to dissolve mineral oils and blown and unblown, drying and semi-drying, vegetable and animal oils and accordingly they may be, and preferably are, employed as ingredients of yarn conditioning or lubricating formulas in conjunction with agents which function wholly or partially as lubricants.

In the following examples and description we have set forth several of the preferred embodiments of our invention, but they are included merely for purposes of illustration and not as a limitation thereof.

Example 1

| | Parts |
|---|---|
| Cellulose acetate | 100 |
| $C_2H_5OC_2H_4NH-C_2H_4OCOCH_3$ | 20 |
| Triphenyl phosphate | 20 |
| Acetone | 300 |
| Ethyl acetate | 100 |

Example 2

| | Parts |
|---|---|
| Cellulose acetate propionate | 100 |
| Butyl phthalate | 20 |
| $CH_3CONH-C_4H_8OCOCH_3$ | 30 |
| Propylene chloride | 200 |
| Ethyl lactate | 100 |
| Acetone | 100 |

Example 3

| | Parts |
|---|---|
| Cellulose nitrate | 100 |
| $CH_3-CO-C_2H_4N-C_2H_4N\begin{smallmatrix}C_2H_4OCO-CH_3\\ \\CO-CH_3\end{smallmatrix}$ with $\begin{smallmatrix}\\COCH_3\end{smallmatrix}$ | 30 |
| Ester gum | 40 |
| Ethyl acetate | 200 |
| Toluene | 100 |
| Ethanol | 100 |

Example 4

| | Parts |
|---|---|
| Cellulose butyrate | 100 |
| $\begin{smallmatrix}CH_2-CH_2\\CH_2\quad\quad CH-N-CO-CH_3\\CH_2\quad\quad CH_2-CH-CH_2-OCOCH_3\\ \quad\quad\quad\quad OCOCH_3\end{smallmatrix}$ | 20 |
| Propylene chloride | 300 |
| Acetone | 100 |

Example 5

| | Parts |
|---|---|
| Ethyl cellulose | 100 |
| β-Hydroxy ethyl (β or γ) hydroxy propyl amine dipropionate | 80 |

Composition of matter prepared as above described may be deposited upon any suitable film forming surface to form a film or sheet, as is well known to those skilled in the art. A film so produced has permanently brilliant transparency and low inflammability, burning no more readily than ordinary newsprint. Such film is exceedingly tough and flexible, as shown by the fact that it will withstand many folds upon a modified Schopper fold-tester (commonly used for such purposes) without breaking and that even after being subjected for a considerable number of days to air maintained at a temperature of 65° C. the film still maintains flexibility (in contrast to almost complete lack of flexibility where no plasticizer is used) demonstrating that the film will withstand ordinary usage satisfactorily for many years. The sum total of the above advantageous properties of a product produced from our new composition is considerably in excess of that of products produced with what have previously been regarded as the better plasticizers.

In order that those skilled in this art may better understand our invention we would state, by way of illustration, that for the manufacture of photographic film or other sheets our new composition of matter may be compounded as follows: 100 parts of acetone soluble cellulose acetate, i. e. cellulose acetate containing from 38% to 42% acetyl radical, approximately, is dissolved with stirring at atmospheric temperature in 300 to 500 parts, preferably 400 parts, by weight, of acetone. To this solution may be added from 5-50 parts by weight, of any one of the above plasticizers, it being found preferable to employ approximately 30 to 40 parts thereof. The amount of plasticizer may be decreased or increased, depending upon whether it is desired to decrease or increase, respectively the properties which this plasticizer contributes to the finished product. The amount of solvent employed may also be decreased or increased, depending upon whether it is desired to have a more or less freely flowing composition, respectively.

Other similar solvents than those mentioned above which are compatible with the cellulose acetate and our new plasticizers may also occur to those skilled in this art. In like manner our plasticizers may be compounded with other single or mixed organic esters of cellulose, such as cellulose aceto-stearate, aceto-malate, or cellulose nitro-acetate, or with the cellulose ethers, a suitable solvent which will dissolve both the cellulosic derivative and the plasticizer being employed.

Inasmuch as our above described composition of matter is quite useful in the production of films and sheets it will be apparent that our new plasticizers may also be employed with advantage in the other branches of the plastic art. For example, as set forth in our copending application filed of even date herewith, compositions of matter similar to those described herein may be employed in the manufacture of artificial silk by the dry spinning method. With a proper coagulating bath they may be employed for wet spinning. It may be desired to employ a composition of different viscosity or evaporation characteristics, but this is a mere matter of changing the solvent proportion or adding evaporation retardants or other high or intermediate boiling constituents, as has been well known in the art for more than a decade.

Our novel plasticizers may be employed also with advantage in connection with a number of the known lacquer and varnish formulas with which it may be found to be compatible. In such cases the plasticizer is usually first put into solution with the cellulose derivative solution and, if non-solvents are added, only to such an extent as will not precipitate the derivative from solution. Also the plasticizer is usually employed in larger amounts, such as from 50 to 60 parts, in compounding lacquers. Other uses within the scope of our invention will also suggest themselves to those skilled in the art and are to be included within the scope of the claims appended hereto.

What we claim is:

1. A composition of matter comprising a cellulose derivative selected from the group consisting of cellulose esters and ethers and an amide selected from the group consisting of the organic ester amides of primary and secondary alkanol amines.

2. A composition of matter comprising cellulose acetate and an amide selected from the group consisting of the organic ester amides of primary and secondary alkanol amines.

3. A composition of matter comprising 100 parts of a cellulose derivative selected from the group consisting of cellulose esters and ethers and 5-50 parts of an amide selected from the group consisting of the organic ester amides of primary and secondary alkanol amines.

4. A composition of matter consisting of cellulose acetate plasticized with N-propionyl-beta-amino-ethyl-propionate.

5. Thin sheet wrapping material comprising essentially organic solvent soluble cellulose acetate plasticized with N-acetyl-beta-amino-ethyl-acetate.

6. Thin sheet wrapping material comprising essentially organic solvent soluble cellulose acetate plasticized with N-propionyl-beta-aminoethyl-propionate.

7. Thin sheet wrapping material comprising essentially organic solvent soluble cellulose acetate plasticized with N:n-butyryl-beta-aminoethyl-n-butyrate.

8. Thin sheet wrapping material comprising essentially organic solvent soluble cellulose acetate plasticized with mono-ethanol-amine-ester-amide.

9. Thin sheet wrapping material comprising essentially organic solvent soluble cellulose ester plasticized with mono - ethanol - amine - ester - amide.

JOSEPH B. DICKEY.
JAMES G. McNALLY.